US005412981A

United States Patent [19]

Myers et al.

[11] Patent Number: 5,412,981

[45] Date of Patent: May 9, 1995

[54] APPARATUS FOR TESTING HIGH PRESSURE INJECTOR ELEMENTS

[75] Inventors: W. Neill Myers; Ewell M. Scott; John C. Forbes; Michael D. Shadoan, all of Huntsville, Ala.

[73] Assignee: The United States of America as represented by the Administrator of the National Aeronautics and Space Administration, Washington, D.C.

[21] Appl. No.: 117,587

[22] Filed: Sep. 7, 1993

[51] Int. Cl.$^{6}$ .................... G01M 15/00; F02M 65/00

[52] U.S. Cl. .................................. 73/119 A; 359/509

[58] Field of Search ............ 73/119 A, 431; 239/211, 239/74, 71

[56] References Cited

U.S. PATENT DOCUMENTS

| | | | |
|---|---|---|---|
| 2,857,759 | 10/1958 | Kiene | 73/119 A |
| 3,081,623 | 4/1963 | Domeisen | 73/119 A |
| 3,449,948 | 6/1969 | Kahle et al. | 73/119 A |
| 3,511,087 | 5/1970 | Emerson et al. | 73/119 A |
| 4,443,072 | 4/1984 | Ballard | 359/509 |
| 4,845,979 | 7/1989 | Farenden et al. | 73/119 A |
| 5,000,043 | 3/1991 | Bunch, Jr. et al. | 73/119 A |

FOREIGN PATENT DOCUMENTS

| | | | |
|---|---|---|---|
| 0956832 | 9/1982 | U.S.S.R. | 73/119 A |

*Primary Examiner*—Richard E. Chilcot, Jr.
*Assistant Examiner*—James M. Olsen
*Attorney, Agent, or Firm*—Robert L. Broad, Jr.; Guy M. Miller; Alan J. Kennedy

[57] ABSTRACT

An apparatus for testing and evaluating the spray pattern of high pressure fuel injector elements for use in supplying fuel to combustion engines. Prior art fuel injector elements were normally tested by use of low pressure apparatuses which did not provide a purge to prevent mist from obscuring the injector element or to prevent frosting of the view windows; could utilize only one fluid during each test; and had their viewing ports positioned one hundred eighty (180°) apart, thus preventing optimum use of laser diagnostics. The high pressure fluid injector test apparatus includes an upper hub, an upper weldment or housing, a first clamp and stud/nut assembly for securing the upper hub to the upper weldment, a standoff assembly within the upper weldment, a pair of window housings having view glasses within the upper weldment, an injector block assembly and purge plate within the upper weldment for holding an injector element to be tested and evaluated, a lower weldment or housing, a second clamp and stud/nut assembly for securing the lower weldment to the upper weldment, a lower hub, a third clamp and stud/nut assembly for securing the lower hub to the lower weldment, mechanisms for introducing fluid under high pressure for testing an injector element, and mechanisms for purging the apparatus to prevent frosting of view glasses within the window housings and to permit unobstructed viewing of the injector element.

20 Claims, 3 Drawing Sheets

APPARATUS FOR TESTING HIGH PRESSURE INJECTOR ELEMENTS

ORIGIN OF THE INVENTION

This invention was made by employees of the United States Government and may be manufactured and used by or for the Government for governmental purposes without the payment of any royalties.

BACKGROUND OF THE INVENTION

1. Field Of the Invention.

The present invention relates to an apparatus for testing high pressure fluid injector elements. The invention provides an improved and low cost apparatus for testing and evaluating the spray patterns of fluid injector elements when placed under high pressure.

2. Description Of Related Art.

In the past, fluid injector elements were normally tested by use of a low pressure apparatus or rig to evaluate the performance and stability characteristics of the injector element. The known prior art apparatuses for testing injector elements had numerous disadvantages and drawbacks in that they normally were restricted to tests under low pressure; they had restrictions respecting their back pressure capability; they could utilize only one fluid during each test; their view ports were positioned one hundred eighty degrees (180° ) apart, thus preventing optimum use of laser diagnostics; and they did not provide a purge to prevent mist from obscuring the injector element or to prevent frosting of the view windows.

SUMMARY OF THE INVENTION

According to the present invention, there is provided an apparatus for testing and evaluating the spray patterns of fluid injector elements which are placed under high pressure. The high pressure fluid injector test apparatus includes an upper hub, an upper weldment or housing, a first clamp and stud/nut assembly for securing the upper hub to the upper weldment, a standoff assembly within the upper weldment, a pair of window housings within the upper weldment, an injector block assembly and purge plate within the upper weldment for holding an injector element to be tested and evaluated, a lower weldment or housing, a second clamp and stud/nut assembly for securing the lower weldment to the upper weldment, a lower hub, a third clamp and stud/nut assembly for securing the lower hub to the lower weldment, means for introducing fluid under high pressure for testing an injector element, and means for purging the apparatus to prevent frosting of view glasses within the window housings.

Accordingly, it is an object of the present invention to provide a versatile and robust apparatus for testing fluid injector elements under high pressure.

Another object of the present invention is to provide an apparatus for testing fluid injector elements which allows the purging of areas surrounding the injector element being evaluated and the view windows to permit unobscured viewing of the element during testing.

It is still a further object of the present invention to provide an apparatus for testing fluid injector elements by the simultaneous use of two fluids during the test.

The above objects and advantages of the present invention will become readily apparent to those skilled in the art to which the invention pertains from a study of the preferred embodiments as set forth in the specification, drawings and appended claims.

DESCRIPTION OF THE PREFERRED EMBODIMENTS

Figure 1:
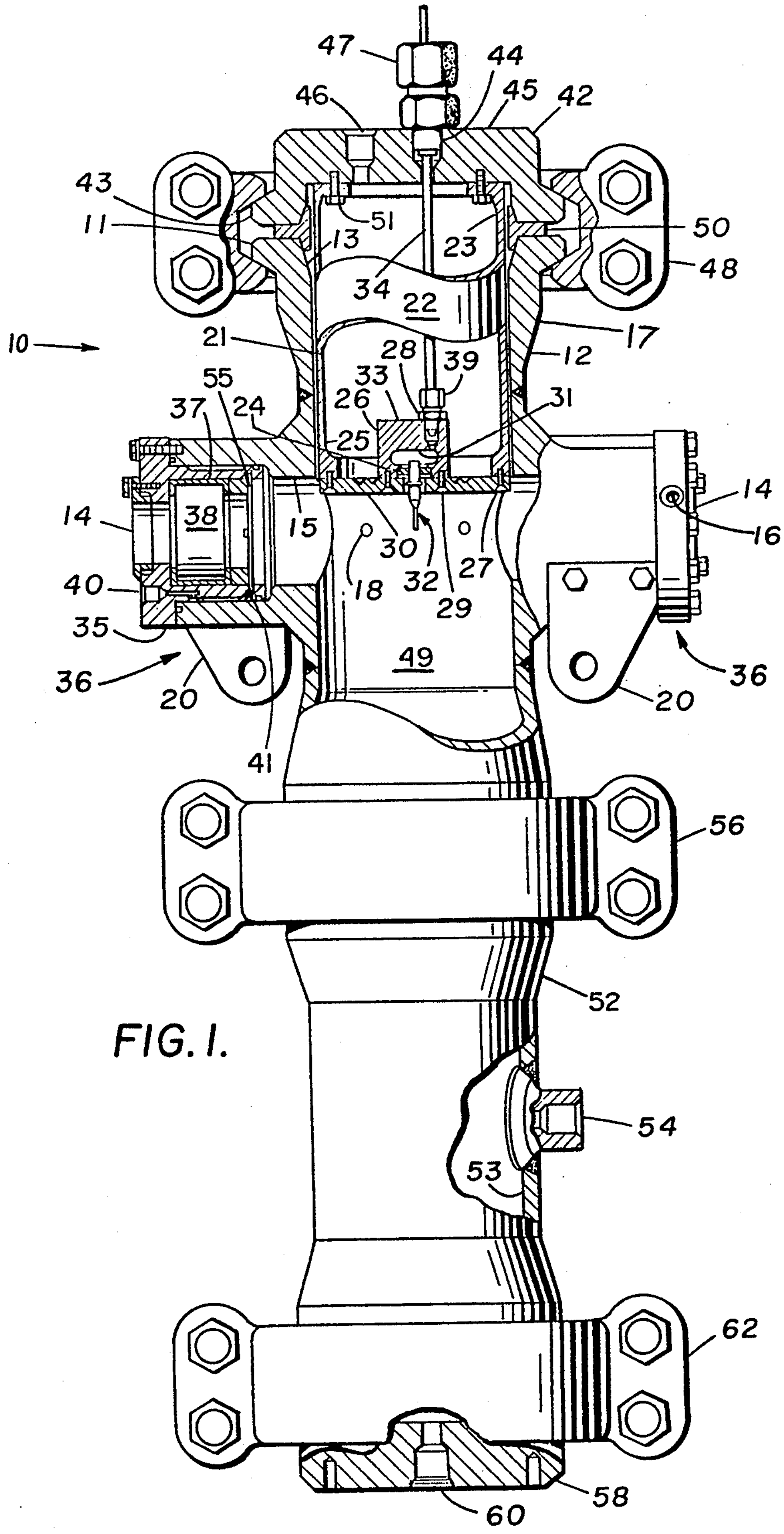
FIG. 1 is a partially sectional front elevational view of a first embodiment of the apparatus for testing high pressure injector elements.

Referring now to FIG. 1 of the drawings, reference numeral 10 generally designates the high pressure fluid injector test apparatus of the present invention. Apparatus 10 generally includes an upper hub 42, an upper weldment or housing 12, a first clamp and stud/nut assembly 48 for securing upper hub 42 to upper weldment 12, a standoff assembly 22 within upper weldment 12, a pair of window housings 36 within upper weldment 12, a lower weldment or housing 52 secured to the upper weldment 12 by a second clamp and stud/nut assembly 56, a lower hub 58, and a third clamp and stud/nut assembly 62 for securing lower hub 58 to lower weldment 42.

Figure 2:
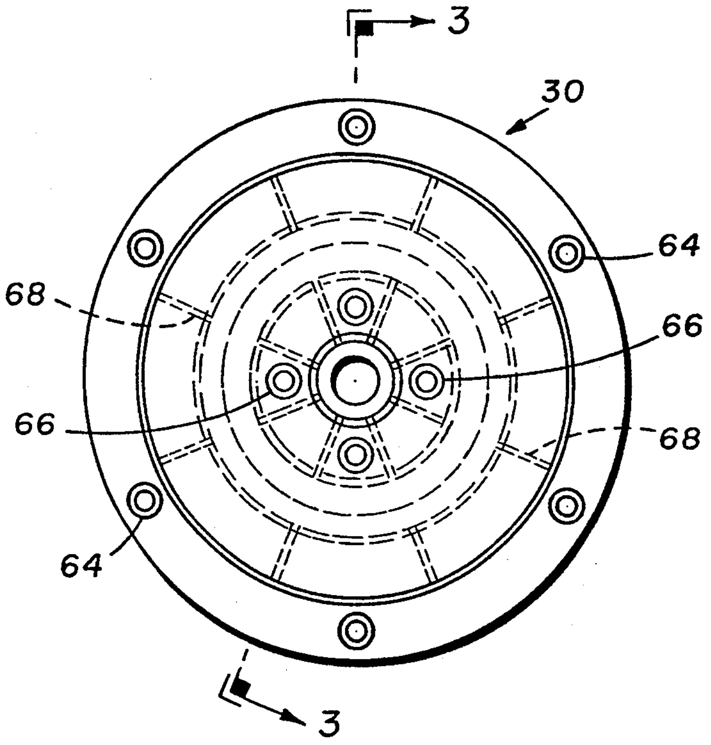
FIG. 2 is a top view of the purge plate utilized in testing the apparatus of the present invention.
Figure 3:
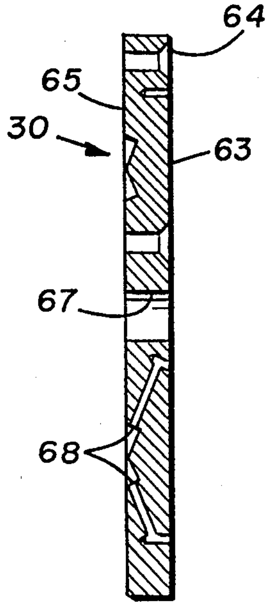
FIG. 3 is a cross-sectional view of the purge plate utilized in the testing apparatus of the present invention taken along line 3—3 of FIG. 2.
Figure 4:
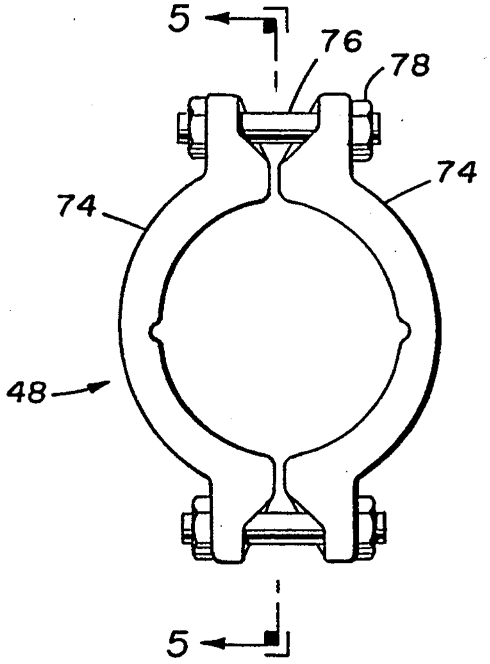
FIG. 4 is a front view of the clamp and stud/nut assemblies utilized with the testing apparatus of the present invention.
Figure 5:
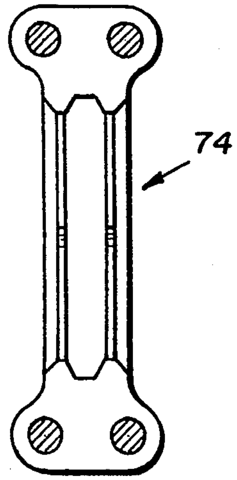
FIG. 5 is a side elevational view of a portion of the clamp and stud/nut assemblies utilized with the testing apparatus of the present invention taken along line 5—5 of FIG. 4.
Figure 7:
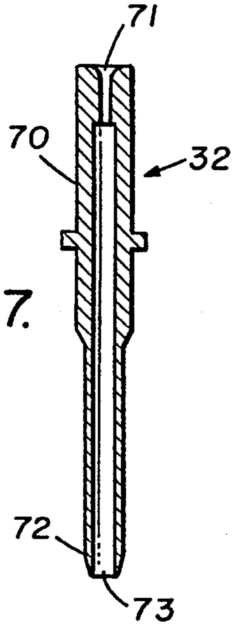
FIG. 7 is a cross-sectional view of a typical injector element to be tested with the first embodiment of the invention as depicted in FIGS. 1–5.

The upper weldment 12 is generally hollow and cylindrical and includes a protruding shoulder 11 at each of its extreme ends (not numbered), an upper section 17 a central bore 13, a pair of laterally extending ports 14, each having a bore 15 and a boss 16 therein. In FIG. 1, the ports 14 are shown as being located one hundred eighty degrees (180°) apart; however, they could be located differently, such as one hundred fifty degrees (150° ) apart. Upper hub 42 includes a protruding shoulder 43 extending from its lower extreme end (not numbered) and a top 45 having a first boss 44 for receiving a fitting 47 which allows the test fluid to enter injector element test apparatus 10 and a second boss 46 for receiving a fitting (not shown) for introducing gaseous nitrogen ($GN_2$) or any other suitable gas into apparatus 10 for reasons explained hereinbelow. Each window housing 36 is generally cylindrical and has an outer flange 35, a laterally projecting sleeve portion 37, a view glass 38 and a laterally extending boss 40 for purposes to be later explained which extends through each of outer flanges 35, respective laterally projecting sleeve 37, passages 41 and annular grooves 55. A plurality of second bosses 18 are in the walls of upper weldment 12 in general alignment with the bore 15 of laterally extending ports 14 for attaching test instruments (not shown). The ports 14 are purged with $GN_2$ through its bosses 16 for preventing external frosting of view glasses 38. Standoff assembly 22 includes a hollow and generally cylindrical member 21 provided with an upper end 23 and a lower end 25 and having a purge plate 30 attached to the lower end 25 thereof by a plurality of threaded screws 27. Standoff assembly 22 further includes an injector block assembly 26 secured to purge plate 30 by a plurality of threaded screws 29 which pass through countersunk openings of purge plate 30. As best shown in FIGS. 2 and 3, purge plate 30 is circular and includes a lower side 63, an upper side 65, a plurality of countersunk openings 64 adjacent its outer edge, a central opening 67, a plurality of countersunk openings 66 outside of central opening 67 and inside of openings 64, a plurality of equally spaced, canted, openings 68 therethrough directed inwardly and outwardly at angles from upper side 65 to lower side 63 (FIG. 3) for permitting the $GN_2$ which was injected through boss 46 to pass through purge plate 30. Injector block assembly 26 is generally inversed, cup-shaped, and includes a cavity 31 therein in communication with a boss 28 and fitting 39 extending from the top 33 of injector block assembly 26 and an injector plate 24 mounted within the opened end (not numbered) of the injector block assembly 26. An injector element 32 to be tested is mounted in the lower portion of the injector block assembly 26 in communication with cavity 31 of the injector block assembly and an injection chamber 49 provided in the lower portion of upper weldment housing 12. The injector element 32 includes an upper end 70, an inlet 71, and an outlet 73 (FIG. 7) and is secured to the injector plate 24 within an opening (not numbered) therein by any suitable means such as brazing with the lower end 72 of injector element 32 being extended through central opening 67 of purge plate 30 into chamber 49. A tube assembly 34 connects boss 44 in upper hub 45 and boss 28 with fitting 39 in injector block assembly 26. A plurality of lugs 20 are secured to the outer walls of the laterally extending ports 14 for mounting the apparatus 10 to an appropriate fixture. Lower weldment or housing 52 includes a protruding shoulder (not shown) similar to shoulders 11 of upper weldment 12 at each of its extreme ends (not numbered), a hollow central bore 53 and a laterally extending purge exit boss 54 in communication with hollow central bore 53. Lower hub 58 is generally cup-shaped and includes a protruding shoulder (not shown) similar to the protruding shoulder 43 of upper hub 42 and an opening in its closed end for supporting a fluid exit boss 60. A conventional seal 50 is mounted between upper weldment 12, upper hub 42, and standoff assembly 22 for sealing purposes. As best shown in FIGS. 4 and 5, the first clamp and stud/nut assembly 48 (as do the assemblies 56 and 62) comprises a pair of clamping segments 74, four bolts 76 and four nuts 78. Assemblies 48, 56 and 62 are known as GRAYLOC clamps, Part No. 70446, and are readily available from Vetco Gray, Inc., Houston, Texas. The first clamp and stud/nut assembly 48 engages the outer surfaces of upper protruding shoulder 11 of upper weldment 12 and the protruding shoulder 43 of upper hub 42 and due to a camming effect between the shoulders and the assembly 48, the seal 50 is compressed to seal the area between the protruding shoulders 11 and 43 of upper weldment 12 and upper hub 42. A seal (not shown), similar to seal 50, is likewise used with second clamp and stud/nut assembly 56 to seal the area between the lower end of upper weldment 12 and the upper end of lower weldment 52. A seal (not shown), likewise similar to seal 50, is used with third clamp and stud/nut assembly 62 to seal the area between the lower end weldment 12 and the laterally protruding shoulder (not shown) of lower hub 58.

With the fluid injector test apparatus 10 fully assembled as shown in FIG. 1 except for the upper hub 42, the first clamp and stud/nut assembly 48, the seal 50, the injector block assembly 26, the purge plate 30 and their associated parts, the operation of the embodiment of the invention depicted in FIG. 1 to evaluate an injector element 32 would proceed as follows: The upper end 23 of standoff assembly 22 is secured to upper hub 42 by screws 51; the injector element 32 which has been secured to the injector plate 24 is then placed within the injector block assembly 26; the injector block assembly 26 is then secured to purge plate 30 by screws 29; the tube assembly 34 is connected to boss 44 and fitting 47 in upper hub 42 and to fitting 39 in boss 28 of block assembly 26; the purge plate 30 is secured to standoff assembly 22 by screws 27 at which time the upper hub 42, the standoff assembly 22, the tube assembly 34, the injector block assembly 26 and purge plate 30 form an integral unit. This integral unit is then inserted into the central bore 13 of upper weldment 12 and with the protruding shoulder 43 of upper hub 42 being firmly secured and sealed to the upper protruding shoulder 11 of upper weldment 12 by first clamp and stud/nut assembly 48. When the setup is complete, a test run is made. Fluid representing an oxidizer which pass through injector element 32 being tested is fed into the injector block assembly 26 through boss 44 and tube assembly 34. At the same time $GN_2$ gas is introduced through bosses 16, 40 and 46 so that mist from the injected fluids will not obscure viewing of the injector element 32. $GN_2$ introduced through boss 46 of upper hub 42 passes through the several angled openings 68 in purge plate 30 to reach the area within chamber 49 of apparatus 10 located below purge plate 30. $GN_2$ introduced through boss 40 passes through passages 41 (FIG. 1) in the wall of port 14 to reach the internal surfaces of view glasses 38 via an annular groove 55 in the wall. Data is gathered to evaluate the performance spray parameters of the injector element 32 to enable better mixing and burning of propellants. At the completion of the test, the injector element test assembly is shut down, and the fluids are drained from the high pressure injector element test apparatus through purge exit boss 54 and fluid exit boss 60.

Figure 6:
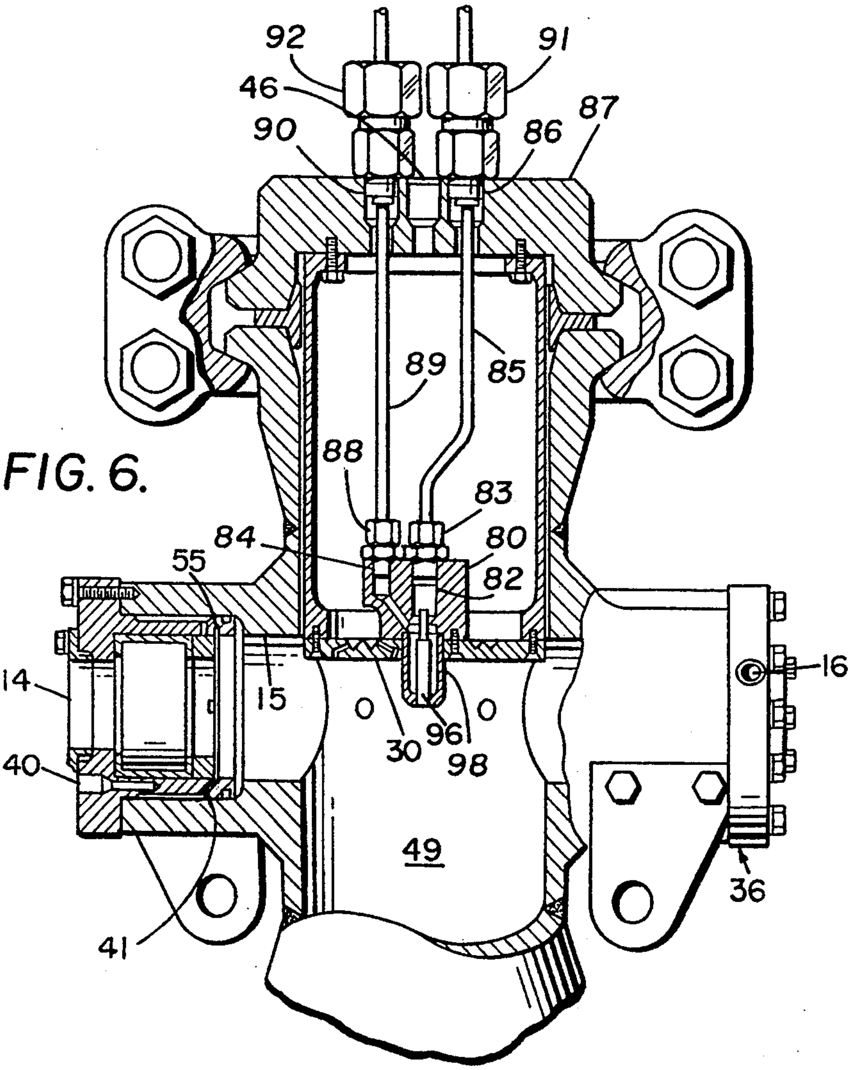
FIG. 6 is a partially broken away, sectional, front elevational view of the upper portion of a second embodiment of the apparatus for testing high pressure injector elements which allows separate test fluids to simultaneously enter the injector element undergoing tests.
Figure 8:
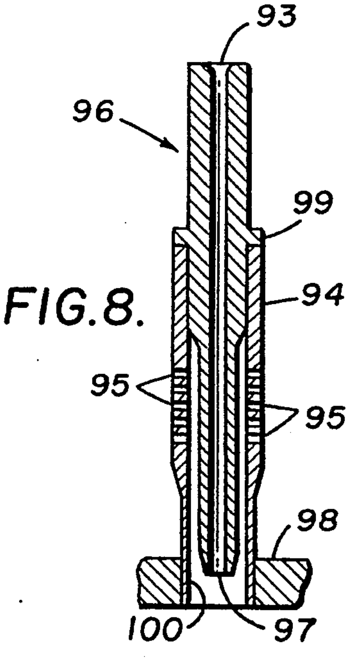
FIG. 8 is a cross-sectional view of a typical injector element with fuel sleeve to be tested with the second embodiment of the invention as depicted in FIG. 6.

The second embodiment of the invention as depicted in FIGS. 6 and 8 differs from the first embodiment as depicted in FIG. 1 primarily in the configuration of the injector block assembly 80 to enable two separate test fluids (simulating both fuel and an oxidizer) to enter the injector element undergoing tests, the addition of a fuel sleeve 94 to the injector element 96 which has an inlet 93 and an outlet 97, and the addition of a cup shaped housing 98 for containing the fuel being fed to the injector element 96. In the embodiment depicted in FIGS. 6 and 8, some reference numerals (e.g. 14,15, 16, 30, 36, 40, 49, and 55) refer to identical components as depicted and described for the embodiment set forth in FIGS. 1–5. In the second embodiment, reference numeral 80 designates the modified injector block assembly which includes a first boss 82 and a second boss 84 therein. The first boss 82 is in communication with a fitting 83 connected to a tube assembly 85 in communication with a boss 86 having a fitting 91 therein in upper hub 87 which allows a fluid simulating an oxidizer to enter the injector block assembly 80 of the test apparatus 10. The second boss 84 is in communication with a fitting 88 connected to a tube assembly 89 in communication with a boss 90 having a fitting 92 in upper hub 87 which allows a fluid simulating an fuel to enter the injector block assembly 80 of test apparatus 10. In the second embodiment as depicted in FIGS. 6 and 8, the upper end (not numbered) of fuel sleeve 94 is secured to flange 99 of injector element 96 by any conventional means such as brazing; the upper end (not numbered) of cup shaped housing 98 is secured to the bottom surface (not numbered) of injector block assembly 80 by any conventional means such as brazing; and the lower end of fuel sleeve 94 is secured to a central opening 100 in the bottom of cup shaped housing 98 by any conventional means such as brazing. In the second embodiment, fuel sleeve 94 is hollow and has a series of spaced openings 95 therein for allowing fuel to leave the cup shaped housing 98 to mix with the oxidizer being fed through the injector element 96 adjacent the outlet 97. The fuel and oxidizer is injected into the injector chamber 49 of upper weldment housing 12 to be observed and analyzed through window housings 32, as described supra. The second embodiment of test apparatus 10 operates substantially the same as explained hereinabove for the first embodiment except that two separate and distinct fluids which simulate a fuel and oxidizer are utilized during the test, with the fuel being introduced through fitting 92, boss 90, tube assembly 89, fitting 88, boss 84, cup-shaped housing 98, spaced openings 95, and through outlet 97 and the oxidizer being introduced through fitting 91, boss 86, tube assembly 85, fitting 83, boss 82, inlet 93, and outlet 97.

While the above description constitutes the preferred embodiments of the present invention, it will be appreciated that the invention is susceptible to modification, variation and change without departing from the proper scope and fair meaning of the accompanying claims. For example, it is readily apparent that the upper weldment 12 can be modified to provide various view post orientations. Furthermore, it is apparent that virtually any type/size of injector element can be tested by apparatus 10 by modifying the injector block assembly.

We claim:

1. An apparatus for testing the efficiency of an injector element having an inlet and an outlet and from which at least one fluid is directed comprising:

- a housing assembly enclosing an injector chamber into which said fluid is injected;
- said injector element being mounted in said housing assembly and disposed for communication between a source of said at least one fluid and said injector chamber;
- first purge means disposed for communication with a source of purge gas for directing said purge gas into said chamber adjacent said injector element outlet for purging the area around said injector element outlet to permit unobstructed viewing thereof; and
- window means mounted in said housing assembly adjacent said chamber to permit visual observation and analysis of the pattern of the injected said at least one fluid in said injection chamber.

2. Apparatus as in claim 1 wherein said window means includes at least one port extending through said housing assembly and communicating into said injector chamber, said at least one port including a view glass having internal and external surfaces mounted in sealed relation therein.

3. Apparatus as in claim 2 including second purge means disposed for communication with a source of purge gas for directing said purge gas into said housing assembly adjacent said internal surface of said view glass.

4. Apparatus as in claim 3 including third purge means disposed for communication with a source of purge gas for directing said purge gas adjacent said external surface of said view glass.

5. Apparatus as in claim 2 wherein said housing assembly includes first and second sections disposed for releasably secured relation therebetween, said first section having support means therein for support of said injector element in said housing assembly, said injector chamber being disposed to receive said at least one said fluid from said injector element for observation and analysis thereof.

6. Apparatus as set forth in claim 5 wherein said support means for supporting said injector element in said housing assembly is an injector block secured to said first section of said housing, said injector block being provided with a cavity communicating with the source of said at least one fluid, said injector element being mounted in said injector block in communicating relation with said cavity of said injector block and said injector chamber.

7. Apparatus as in claim 6 wherein said first purge means includes a purge plate having a series of space openings therein for allowing said purge gas to enter said injector chamber.

8. Apparatus as in claim 7 wherein said purge plate has upper and lower sides and wherein each of said spaced openings in said purge plate are canted from said upper and lower sides.

9. Apparatus as in claim 1 wherein said first purge means further includes a purge plate having at least one opening therein for allowing said purge gas to enter said injector chamber.

10. An apparatus for testing the efficiency of a fuel injector element having a fuel inlet and a fuel outlet from which fuel is sprayed, said apparatus comprising:

- an upper hub including a plurality of bosses therethrough;
- a hollow upper housing including an upper section, an intermediate section including a plurality of ports and an injector chamber, and a lower section;
- a hollow standoff assembly within said upper section of said upper housing and secured to said upper hub;
- a purge plate including a central opening and a plurality of equally spaced openings therein, said purge plate being secured to said standoff assembly;
- an injector block assembly secured to said purge plate and including an upper surface having at least one boss therein, a cavity in communication with said at least one boss in said upper surface;
- means for mounting said fuel injector element to said injector block assembly and being disposed to permit said injector element to extend through said central opening of said purge plate into said injector chamber;

a window housing mounted within each of said ports in said intermediate section of said upper housing, each of said window housings having a view glass mounted therein;

means for securing and sealing said upper housing to said upper hub;

a hollow lower housing having a purge exit boss;

means for securing and sealing said lower housing to said upper housing;

means for closing off said lower housing and including a fluid exit boss;

means for introducing fluid under pressure through one of said bosses in said upper hub to said cavity in said injector block assembly and through said injector element being tested; and means for purging an area within said injector chamber and the interior and exterior of each of said view glasses mounted within said window housing to permit unobstructed viewing of said injector element during a test.

11. The apparatus for testing the efficiency of a fuel injector element as set forth in claim 10 wherein said means for mounting said fuel injector element includes an injector plate mounted within said cavity of said injector block assembly with said injector plate being secured to said fuel injector element.

12. The apparatus for testing the efficiency of a fuel injector element as set forth in claim 11 further including means for securing said purge plate to said injector block assembly.

13. The apparatus for testing the efficiency of a fuel injector element as set forth in claim 12 wherein said means for securing and sealing said upper housing to said upper hub includes a clamping assembly comprising a pair of clamping segments, a plurality of nuts and bolts, and a seal.

14. The apparatus for testing the efficiency of a fuel injector element as set forth in claim 13 wherein said means for introducing fluid under pressure to said cavity of said injector block assembly and through said injector element includes a boss in said upper hub, a fitting mounted in said boss, a boss in the upper surface of said injector block assembly, a fitting mounted in said boss in said upper surface of said injector block assembly and a tube assembly connected to each of said fittings.

15. The apparatus for testing the efficiency of a fuel injector element as set forth in claim 14 wherein said means for purging an area within said injector chamber and the interior and exterior of said view glasses includes a boss in said upper hub for receiving a gaseous fluid under pressure.

16. The apparatus for testing the efficiency of a fuel injector element as set forth in claim 15 wherein said means for purging an area surrounding said fuel injector element and the interior and exterior of said view glasses includes a boss within said window housing for receiving a gaseous fluid under pressure.

17. The apparatus for testing the efficiency of a fuel injector element as set forth in claim 10 wherein said means for mounting said fluid injector element includes a cup-shaped housing which substantially surrounds said fuel injector element.

18. The apparatus for testing the efficiency of a fluid injector element as set forth in claim 17 further including means for securing said purge plate to said injector block assembly and wherein said injector block assembly includes a second boss in its upper surface in communication with the interior of said cup-shaped housing.

19. The apparatus for testing the efficiency of a fuel injector element as set forth in claim 18 further including means for introducing a second fluid to said fuel injector element through said second boss of said injector block assembly.

20. The apparatus for testing the efficiency of a fuel injector element as set forth in claim 19 wherein said means for purging an area surrounding said fuel injector element being tested and the interior and exterior of said view glasses includes a boss in said upper hub for receiving a gaseous fluid under pressure and a pair of bosses in each of said window housings for receiving a gaseous fluid under pressure.

* * * * *